(12) United States Patent
Eisenbeiss et al.

(10) Patent No.: US 12,416,547 B2
(45) Date of Patent: Sep. 16, 2025

(54) TIRE TEST STAND WITH A HEXAPOD ASSEMBLY AND A BELT

(71) Applicant: ZF Friedrichshafen AG, Friedrichshafen (DE)

(72) Inventors: Jens Eisenbeiss, Fuerstenzell (DE); Roland Bösl, Neuburg am Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 99 days.

(21) Appl. No.: 18/256,152

(22) PCT Filed: Dec. 2, 2021

(86) PCT No.: PCT/EP2021/083943
§ 371 (c)(1),
(2) Date: Jun. 6, 2023

(87) PCT Pub. No.: WO2022/122538
PCT Pub. Date: Jun. 16, 2022

(65) Prior Publication Data
US 2024/0110849 A1   Apr. 4, 2024

(30) Foreign Application Priority Data
Dec. 10, 2020   (DE) ..................... 10 2020 215 612.3

(51) Int. Cl.
*G01M 17/02* (2006.01)

(52) U.S. Cl.
CPC ................. *G01M 17/022* (2013.01)

(58) Field of Classification Search
CPC ............ G01M 17/02; G01M 17/0074; G01M 17/021; B60C 19/00
See application file for complete search history.

(56) References Cited

U.S. PATENT DOCUMENTS

| | | |
|---|---|---|
| 6,247,348 B1 | 6/2001 | Yamakado et al. |
| 7,254,995 B2 | 8/2007 | Leska, Sr. et al. |
| (Continued) | | |

FOREIGN PATENT DOCUMENTS

| | | | |
|---|---|---|---|
| DE | 30 40 252 A1 | 10/1982 | |
| DE | 10 2004 021 305 A1 | 11/2005 | |
| DE | 10 2009 002 169 A1 | 10/2010 | |
| EP | 2 602 602 A1 | 6/2013 | |
| JP | 3617231 B2 | 2/2005 | |
| WO | WO-9852009 A1 * | 11/1998 | ............ G01M 1/323 |

OTHER PUBLICATIONS

Machine Translation of DE102009002169A1 (Year: 2010).*
(Continued)

*Primary Examiner* — Stephen D Meier
*Assistant Examiner* — Quang X Nguyen
(74) *Attorney, Agent, or Firm* — Finch & Maloney PLLC

(57) ABSTRACT

A tire test stand includes a frame, a tire holder, and a hexapod assembly having six linear drive elements, each of the six linear drive elements being attached at a first end to the frame and at a second end to the tire holder. A tire can be attached to the tire holder so as to be rotatable about its axis of rotation. The test stand also has two rotatably mounted deflection pulleys that are partially looped around by a belt such that the belt forms a flat belt portion between the deflection pulleys. When the tire is rotatably attached to the tire holder, the tire can be brought into a contact position in which the tread of the tire contacts the flat belt portion. When in the contact position and the belt is moved in relation to the tire, the tire rolls on the flat belt portion.

9 Claims, 1 Drawing Sheet

(56) References Cited

U.S. PATENT DOCUMENTS

| | | | |
|---|---|---|---|
| 8,196,462 B2 * | 6/2012 | Stalnaker | G01M 17/02 |
| | | | 73/146 |
| 10,585,020 B2 | 3/2020 | Smith et al. | |
| 11,644,387 B2 | 5/2023 | Trachtler et al. | |
| 2010/0037686 A1 * | 2/2010 | Kitagawa | G01M 17/022 |
| | | | 73/146 |

OTHER PUBLICATIONS

European Patent Office, International Search Report issued in International patent application No. PCT/EP2021/083943 (May 12, 2022).

European Patent Office, Written Opinion issued in International patent application No. PCT/EP2021/083943 (May 12, 2022).

German Patent Office, Search Report issued in German patent application No. 10 2020 215 612.3 (Jun. 24, 2021).

European Patent Office, International Search Report issued in International patent application No. PCT/EP2021/083945 (Mar. 23, 2022).

European Patent Office, Written Opinion issued in International patent application No. PCT/EP2021/083945 (Mar. 23, 2022).

German Patent Office, Search Report issued in German patent application No. 10 2020 215 617.4 (Jun. 24, 2021).

MTS Systems Corporation, "MTS Flat-Trac III SS Tire Test System For Steady State Force and Moment Testing of Passenger Car Tires" available at https://www.mts.com/cs/groups/public/documents/library/dev_003377.pdf (Dec. 31, 2003).

* cited by examiner

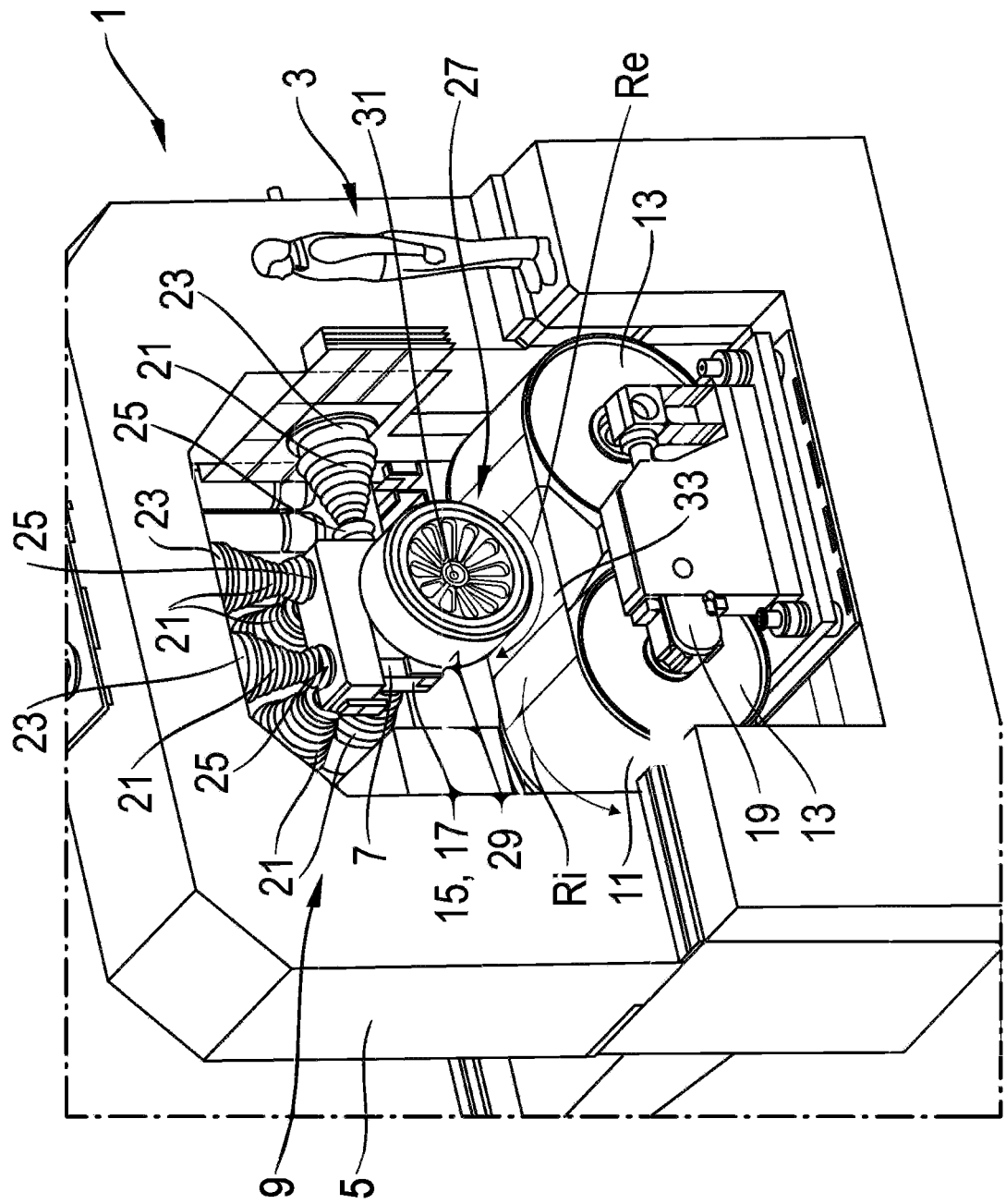

TIRE TEST STAND WITH A HEXAPOD ASSEMBLY AND A BELT

RELATED APPLICATIONS

This application claims the benefit under 35 U.S.C. § 371 as a U.S. National Phase Application of application no. PCT/EP2021/083943, filed on 2 Dec. 2021, which claims benefit of German Patent Application no. 10 2020 215 612.3 filed on 10 Dec. 2020, the contents of which are hereby incorporated herein by reference in their entireties.

FIELD OF THE DISCLOSURE

The present invention relates to a tire test stand.

BACKGROUND

Tire test stands are known from the prior art. Said tire test stands usually have a frame and a tire holder. A tire with a tread can be attached to the tire holder so as to be rotatable about its axis of rotation. When the tire is rotatably attached to the tire holder, the tire can be moved into different positions relative to the frame.

The tire test stands known from the prior art provide a rolling surface unit with a rolling surface, which can be moved in relation to the frame. The rolling surface of the rolling surface unit may also be referred to as a substitute road and is intended to approximately simulate the conditions on a road. The rolling surface unit can be formed, for example, by a rotatably mounted drum of the tire test stand, and the rolling surface can be formed by a peripheral outer surface of the drum.

When the tire is rotatably attached to the tire holder, the tire can be brought into a contact position in which the tread of the tire and the peripheral outer surface of the drum are in contact. When the tire and the peripheral outer surface of the drum are in contact and the peripheral outer surface is moved in relation to the tire, the tire can roll on the peripheral outer surface.

SUMMARY

In general, it is desirable that the reaction of the tire to different load states of the tire and the chassis kinematics of on-road driving can be simulated particularly well with a tire test stand.

It is therefore the object of the present invention to simulate the reaction of the tire to different load states and to simulate the chassis kinematics encountered during on-road driving.

According to the invention, the stated object is achieved by a tire test stand as variously disclosed herein. In one example, the tire test stand has a frame. The tire test stand also has a tire holder. The tire test stand also has a hexapod assembly with six linear drive elements. Each of the six linear drive elements is attached at a first end to the frame and at a second end to the tire holder. A tire with a tread can be attached to the tire holder so as to be rotatable about its axis of rotation. In addition, the tire test stand has a belt. The tire test stand also has two rotatably mounted deflection pulleys. The belt partially loops around the deflection pulleys, and therefore the belt forms a flat belt portion between the deflection pulleys. When the tire is rotatably attached to the tire holder, the tire can be brought by adjustment of the linear drive elements of the hexapod assembly into a contact position. In the contact position, the tread of the tire and the flat belt portion are in contact. Furthermore, when the tire and the flat belt portion are in contact and the belt is moved in relation to the tire, the tire rolls on the flat belt portion.

The tire test stand has the frame. Various components of the tire test stand, such as, for example, the first end of each of the six linear drive elements, can be attached to the frame. Further components of the tire test stand that can be attached to the frame are the two rotatably mounted deflection pulleys. Furthermore, an operating element for operating the tire test stand by an operator of the tire test stand can be attached to the frame of the tire test stand as one of the various components.

The tire test stand also has the tire holder. A tire can be attached to the tire holder so as to be rotatable about its axis of rotation.

The tire test stand also has the hexapod assembly with the six linear drive elements. In particular, the length of each linear drive element of the six linear drive elements can be adjusted. The hexapod assembly may be referred to as parallel kinematics. One advantage of the hexapod assembly is that it can have a high level of rigidity in comparison to conventional adjustment units, which are designed as serial kinematics, while requiring a comparatively small amount of space. The hexapod assembly also affords the advantage that, compared to conventional adjustment units which are designed as serial kinematics, it has a high level of adjustment accuracy. In particular, the hexapod assembly can be used to bring the tire into different positions, such as the contact position, with a high degree of precision compared to conventional adjustment units which are designed as serial kinematics. In conjunction with the present invention, it has surprisingly turned out that the hexapod assembly, in particular in combination with the flat belt portion, can simulate the real chassis kinematics of a vehicle in a test environment better than the tire test stands known from the prior art.

Each of the six linear drive elements is attached at a first end to the frame and at a second end to the tire holder. The six linear drive elements can be described as acting parallel to one other between the frame and the tire holder, and therefore the hexapod assembly can be described as parallel kinematics. In particular, by adjustment of the linear drive elements, the tire holder can be moved relative to the frame and brought into different positions. Preferably, each linear drive element of the six linear drive elements is pivotably attached at the first end to the frame and pivotably attached at the second end to the tire holder such that each linear drive element can assume different orientations by adjustment of the linear drive elements and pivoting in relation to the frame and to the tire holder.

The tire with the tread can be attached to the tire holder so as to be rotatable about its axis of rotation. A tire may therefore be attached, or a tire may not be attached, to the tire holder. In particular as a result of the fact that the tire holder can be moved relative to the frame and can be brought into different positions by adjustment of the linear drive elements, a tire attached to the tire holder can be moved relative to the frame, and brought into different positions, by adjustment of the linear drive elements.

In addition, the tire test stand has the belt. The belt may also be referred to as an endless band or strap. The belt is preferably designed to transmit tensile force. In particular, the belt is closed in its longitudinal direction such that the ends of the belt arranged in the longitudinal direction of the belt are connected to one another or merge into one another.

The tire test stand also has the two rotatably mounted deflection pulleys. The two deflection pulleys can be rotatably mounted on the frame.

The belt partially loops around the deflection pulleys, and therefore the belt forms a flat belt portion between the deflection pulleys. The belt can form a first strand and a second strand. The first strand may be referred to as the working strand and can extend from a first one of the deflection pulleys to a second one of the deflection pulleys. The second strand may be referred to as the slack strand and can extend from the first one of the deflection pulleys to the second one of the deflection pulleys. The flat belt portion can form a portion of the first strand. In the region of the first strand, the belt can perform a straight-line movement in a revolving direction of the belt such that the flat belt portion is formed. The flat belt portion is flat. Preferably, the flat belt portion extends along a tangential plane at the belt, in which a contact point between the tread and the flat belt portion lies when the tire is rotatably attached to the tire holder and the tread of the tire and the flat belt portion are in contact. The evenness of the belt portion ensures that the tire can roll on a flat rolling surface. A flat rolling surface formed by the flat belt portion is particularly advantageous in comparison to a rolling surface formed in a curved manner by a peripheral outer surface of the drum, since the flat belt portion can simulate a real road, in particular its flat shape, better than tire test stands known from the prior art, in particular those with a rolling surface which is formed by a peripheral outer surface of a drum. In particular, it has been found that the rolling resistance of the tire when rolling on the flat belt portion was able to be significantly reduced compared to a curved rolling surface. Furthermore, the combination of belt and deflection pulleys provides a rolling surface which saves on space compared to a rolling surface on a drum that is large in size in order to reduce the curvature.

When the tire is rotatably attached to the tire holder, the tire can be brought by adjustment of the linear drive elements of the hexapod assembly into a contact position. As already described, in particular as a result of the fact that the tire holder can be moved relative to the frame and can be brought into different positions by adjustment of the linear drive elements, a tire attached to the tire holder can be moved relative to the frame, and brought into different positions, by adjustment of the linear drive elements. In particular, the tire can be brought into the contact position by adjustment of the linear drive elements of the hexapod assembly. In the contact position, the tread of the tire and the flat belt portion are in contact. Preferably, by adjustment of the linear drive elements of the hexapod assembly, the tire can be brought into further contact positions in addition to the contact position, such that, for example, a camber of the tire, a skewing of the tire, a tire load of the tire, in particular perpendicular to the tangential plane at the belt, in which the contact point lies between the tread and the flat belt portion, and/or the position of the tire relative to the flat belt portion, in particular parallel to the tangential plane at the belt, in which the contact point between the tread and the flat belt portion lies, and perpendicular to the belt revolving direction in the region of the flat belt portion and/or parallel to the belt revolving direction in the region of the flat belt portion, can be adjusted.

Furthermore, when the tire and the flat belt portion are in contact and the belt is moved in relation to the tire, the tire rolls on the flat belt portion. The flat belt portion preferably forms a flat rolling surface on which the tire can roll. As already described, the tire can be brought into further contact positions in addition to the contact position by adjustment of the linear drive elements of the hexapod assembly. If the tire then rolls on the flat belt portion, the tire can be brought into different load states as it rolls. For example, as the tire rolls on the flat belt portion, the camber of the tire, the skewing of the tire, the tire load of the tire, in particular perpendicular to the tangential plane at the belt, in which the contact point lies between the tread and the flat belt portion, and/or the position of the tire relative to the flat belt portion, in particular parallel to the tangential plane at the belt, in which the contact point between the tread and the flat belt portion lies, and perpendicular to the belt revolving direction in the region of the flat belt portion and/or parallel to the belt revolving direction in the region of the flat belt portion, can be adjusted.

In conjunction with tire test stands, it has been found that, from a technical aspect, a person skilled in the art would refrain from using a flat rolling surface, since, for example, they would not use a belt because the forces acting on the belt due to the different load states of the tire are extremely complex and, for example, during movement of the belt, the latter is at risk of becoming detached from the deflection pulleys, in particular due to forces that act perpendicular to the revolving direction of the belt, if no technically complex and costly precautions are taken. The tire test stands known from the prior art therefore relate to drums with curved rolling surfaces. In conjunction with the present invention, however, it has been found that the combination of the hexapod assembly and the flat belt portion justifies the increased technical complexity and increased costs, since this combination surprisingly can particularly well simulate the real chassis kinematics when driving on a road.

It has also been found in conjunction with tire test stands that a person skilled in the art would refrain from using a hexapod assembly from a technical aspect, since the hexapod assemblies known from the prior art, for example because of their symmetrical design, have low degrees of rigidity in directions which are disadvantageous for the testing of tires that are brought into different load states when rolling, and therefore, when measuring the reaction forces of the tire in response to the different load states of the tire, the low degree of rigidity and the unfavorable deformation of the hexapod assembly have to be taken into account and, for example, excluded. For example, due to the symmetrical structure of the hexapod assemblies known from the prior art, it is not possible to arrange the linear drive elements in such a manner that at least three linear drive elements of the six linear drive elements are arranged such that when a first linear drive element of the three linear drive elements exerts a force on the tire, the largest force component of said force is oriented in the direction of the first spatial direction of the three spatial directions, that when a second linear drive element of the three linear drive elements exerts a force on the tire, the largest force component of said force is oriented in the direction of the second spatial direction of the three spatial directions, and that when a third linear drive element of the three linear drive elements exerts a force on the tire, the largest force component of said force is oriented in the direction of the third spatial direction of the three spatial directions. The tire test stands known from the prior art therefore relate to serial kinematics, in which the directions of force exertion on the tire can be realized in all three spatial directions using comparatively simple technical means at comparatively low costs. In conjunction with the present invention, however, it has been found that the combination of the hexapod assembly and the flat belt portion justifies the increased technical complexity and increased costs, since this combination surprisingly can particularly well simulate the real chassis kinematics when driving on a road.

In conjunction with the present invention, when measuring the reaction forces of the tire in response to the different load states of the tire, it was surprisingly found that when the tire rolls on the flat belt portion when using a hexapod assembly, owing to the hexapod assembly and the flat belt portion the reaction of the tire to the different load states better corresponds to a reaction of a tire when used on a real road than is the case with tire test stands known from the prior art. In particular, it has been found that the combination of the hexapod assembly and the flat belt portion enables the real chassis kinematics to be simulated particularly well when driving on a road.

In summary, it can therefore be stated that the tire test stand can simulate particularly well the reaction of the tire to different load states of the tire and the chassis kinematics when driving on a road.

In one embodiment, at least one of the linear drive elements of the hexapod assembly is designed as a hydraulic cylinder. The design of at least one of the linear drive elements of the hexapod assembly as a hydraulic cylinder ensures that comparatively high forces can be transmitted. Furthermore, the design of at least one of the linear drive elements of the hexapod assembly as a hydraulic cylinder ensures uniform and precise adjustment movements. In particular, the positioning accuracy of the hexapod assembly can be increased by designing at least one of the linear drive elements of the hexapod assembly as a hydraulic cylinder. Each of the linear drive elements of the hexapod assembly is particularly preferably designed as a hydraulic cylinder. The advantages mentioned for the at least one linear drive element apply correspondingly to each of the linear drive elements.

In one embodiment, at least one of the linear drive elements of the hexapod assembly is designed as an electromechanical linear drive. The design of at least one of the linear drive elements of the hexapod assembly as an electromechanical linear drive ensures comparatively high adjustment speeds and high adjustment accelerations for adjusting the linear drive elements. Furthermore, the design of at least one of the linear drive elements of the hexapod assembly as an electromechanical linear drive ensures uniform and precise adjustment movements. In particular, the positioning accuracy of the hexapod assembly can be increased by designing at least one of the linear drive elements of the hexapod assembly as an electromechanical linear drive. Each of the linear drive elements of the hexapod assembly is particularly preferably designed as an electromechanical linear drive. The advantages mentioned for the at least one linear drive element apply correspondingly to each of the linear drive elements.

In one embodiment, the tire test stand has a tire drive unit which, when the tire is rotatably attached to the tire holder, can drive said tire in a tire revolving direction. With the aid of the tire drive unit, the tire can be driven in the tire revolving direction and thus set into a rotational movement about its axis of rotation. Furthermore, with the aid of the tire drive unit, the tire can be accelerated in the tire revolving direction when rolling on the flat belt portion such that the tire can be brought into a further load state. In the event that the tire test stand does not have a belt drive unit, by driving the tire in the tire revolving direction and contact between the tread and the flat belt portion, the belt can be driven in the belt revolving direction.

In one embodiment, the tire test stand has a tire braking unit which, when the tire is rotatably attached to the tire holder, can brake said tire in a tire revolving direction. With the aid of the tire braking unit, the tire can be braked in the tire revolving direction and the rotational movement about its axis of rotation can thus be slowed down. The rotational speed of the tire can be reduced in the tire revolving direction with the aid of the tire braking unit. Furthermore, with the aid of the tire braking unit, the tire can be braked in the revolving direction of the tire when rolling on the flat belt portion such that the tire can be brought into a further load state.

In one embodiment, the tire test stand has a belt drive unit which can drive the belt in a belt revolving direction. The belt can be driven in the belt revolving direction by means of the belt drive unit. In the event that the tire test stand does not have a tire drive unit, by driving the belt in the belt revolving direction and contact between the tread and the flat belt portion, the tire can be driven in the tire revolving direction.

In one embodiment, the belt drive unit is coupled to a deflection pulley of the deflection pulleys in order to drive the belt in the belt revolving direction via said deflection pulley. The coupling of the belt drive unit to a deflection pulley of the deflection pulleys in order to drive the belt via said deflection pulley in the belt revolving direction provides a technically simple and cost-effective drive for the belt, since additional components for coupling the belt drive unit to the belt can be dispensed with. The belt drive unit is preferably coupled to two deflection pulleys of the deflection pulleys in order to drive the belt in the belt revolving direction via said deflection pulleys. Coupling the belt drive unit to two deflection pulleys of the deflection pulleys in order to drive the belt in the belt revolving direction via said deflection pulleys ensures that the introduction of force into the belt in order to drive the latter is provided at a plurality of points and the mechanical load on the belt can thus be reduced.

Further advantages, features and possibilities of use of the present invention will emerge from the following description of exemplary embodiments and the figures. All the features described and/or illustrated pictorially form the subject matter of the invention on their own and in any combination, also independently of their composition in the individual claims or their dependency references. In the figures, the same reference symbols continue to represent the same or similar objects.

BRIEF DESCRIPTION OF THE DRAWINGS

FIG. 1 is the sole FIGURE that shows a schematic view of an embodiment of a tire test stand according to the invention.

DETAILED DESCRIPTION

FIG. 1 illustrates a schematic view of an embodiment of a tire test stand 1 according to the invention. FIG. 1 also shows an operator 3 of the tire test stand 1.

The tire test stand 1 has a frame 5, a tire holder 7, a hexapod assembly 9, a belt 11 and two deflection pulleys 13. The tire test stand 1 also has a tire drive unit 15, a tire braking unit 17, and a belt drive unit 19.

The hexapod assembly 9 has six linear drive elements 21. Each of the six linear drive elements 21 has a first end 23 and a second end 25. Each of the six linear drive elements 21 is attached at the first end 23 to the frame 5 and at the second end 25 to the tire holder 7. A portion of the frame 5 extends into the rear part of FIG. 1 and is covered by the portion of the frame 5 that is visible in FIG. 1. Three of the six linear drive elements 21 are attached at the first end 23 to the portion of the frame 5 that is visible in FIG. 1. A further three of the six linear drive elements 21 are attached at the first end 23 to the portion of the frame 5 which is covered in FIG. 1. Each of the six linear drive elements 21 is encased by a bellows to protect the linear drive element 21 from being soiled. In the embodiment of the tire test stand 1 according to the invention illustrated in FIG. 1, each of the six linear drive elements 21 of the hexapod assembly 9 is designed as an electromechanical linear drive. Alternatively, each of the six linear drive elements 21 of the hexapod assembly 9 can also be designed as a hydraulic cylinder by retrofitting.

Furthermore, FIG. 1 illustrates a tire 27 with a tread 29. The tire 27 is attached to the tire holder 7 so as to be rotatable about its axis of rotation 31. The tire drive unit 15 can drive the tire 27, which is rotatably attached to the tire holder 7, in a tire revolving direction Re. The tire braking unit 17 can brake the tire 27, which is rotatably attached to the tire holder 7, in the tire revolving direction Re, i.e. can reduce the rotational speed of the tire 27 in the tire revolving direction Re.

As already mentioned, the tire test stand 1 has the belt 11 and the two deflection pulleys 13. The two deflection pulleys 13 are rotatably mounted. The belt 11 partially loops around the deflection pulleys 13 such that the belt 11 forms a flat belt portion 33 between the deflection pulleys 13. The tire 27, which is rotatably attached to the tire holder 7, can be brought by adjustment of the linear drive elements 21 of the hexapod assembly 9 into a contact position, which is illustrated in FIG. 1 and in which the tread 29 of the tire 27 and the flat belt portion 33 are in contact.

As already described, the tire test stand 1 has the belt drive unit 19. The belt drive unit 19 can drive the belt 11 in a belt revolving direction Ri. In the embodiment of the tire test stand 1 according to the invention illustrated in FIG. 1, the belt drive unit 19 is coupled to the deflection pulley 13, illustrated on the left in FIG. 1, of the deflection pulleys 13 in order to drive the belt 11 in the belt revolving direction Ri via said deflection pulley 13. When the tire 27 and the flat belt portion 33 are then in contact and the belt 11 is moved in relation to the tire 27, the tire 27 rolls on the flat belt portion 33.

In the exemplary embodiment illustrated in FIG. 1, the tire 27 can be positioned with respect to the flat belt portion 33 using the hexapod assembly 9. In particular, the tire 27 can be brought by adjustment of the linear drive elements 21 of the hexapod assembly 9 into the contact position in which the tread 29 of the tire 27 is in contact with the flat belt portion 33. Furthermore, by adjustment of the linear drive elements 21 of the hexapod assembly 9, the tire 27, in addition to the contact position, can be brought into further contact positions in which the tread 29 of the tire 27 is also in contact with the flat belt portion 33. If the tire 27 then rolls on the flat belt portion 33, the tire 27 is brought into different load states as it rolls. By adjustment of the linear drive elements 21 when the tire 27 rolls on the flat belt portion 33, the camber of the tire 27, the skewing of the tire 27, the tire load of the tire 27, and/or the position of the tire 27 relative to the flat belt portion 33 can be adjusted. In addition, the tire 27 can be driven in the tire revolving direction Re by the tire drive unit 15 or braked in the tire revolving direction Re by the tire braking unit 17. As a result, the tire 27 can be brought into different load states as it rolls.

In conjunction with the present invention, when measuring the reaction forces of the tire 27 in response to the different load states of the tire 27, it was surprisingly found that when the tire 27 rolls on the flat belt portion 33 when using the hexapod assembly 9, owing to the hexapod assembly 9 and the flat belt portion 33 the reaction of the tire 27 to the different load states better corresponds to a reaction of a tire when used on a real road than is the case with tire test stands known from the prior art. In particular, it has been found that the combination of the hexapod assembly 9 and the flat belt portion 33 enables the real chassis kinematics to be simulated particularly well when driving on a road.

In addition, it should be pointed out that "comprising" does not exclude other elements or steps and "a" or "an" does not exclude a plurality. Furthermore, it should be pointed out that features that have been described with reference to one of the above exemplary embodiments can also be used in combination with other features of other exemplary embodiments described above. Reference signs in the claims should not be regarded as limiting.

REFERENCE SIGNS 1 tire test stand
3 operator
5 frame
7 tire holder
9 hexapod assembly
11 belt
13 deflection pulley
15 tire drive unit
17 tire braking unit
19 belt drive unit
21 linear drive element
23 first end of a linear drive element
25 second end of a linear drive element
27 tire
29 tread
31 axis of rotation
33 flat belt portion
Re tire revolving direction
Ri belt revolving direction

The invention claimed is:

1. A tire test stand, comprising:
   a frame;
   a tire holder;
   a hexapod assembly with only six linear drive elements, each of the six linear drive elements being attached at a first end to the frame and at a second end to the tire holder, wherein the tire test stand is configured for attaching a tire to the tire holder so as to be rotatable about an axis of rotation;
   a belt; and
   two rotatably mounted deflection pulleys are attached to the frame, the deflection pulleys being partially looped around by the belt such that the belt forms a flat belt portion between the deflection pulleys;
   wherein when the tire is rotatably attached to the tire holder, the tire can be brought by adjustment of the linear drive elements of the hexapod assembly into a contact position in which a tread of the tire and the flat belt portion are in contact; and
   wherein when the tread and the flat belt portion are in contact and the belt is moved in relation to the tire, the tire rolls on the flat belt portion; and
   wherein at least three of the six linear drive elements are arranged such that:

when a first linear drive element of the at least three linear drive elements exerts a force on the tire, the largest force component of the force is oriented in a first spatial direction of the three spatial directions, when a second linear drive element of the at least three linear drive elements exerts a force on the tire, the largest force component of the force is oriented in a second spatial direction of the three spatial directions, and when a third linear drive element of the three linear drive elements exerts a force on the tire, the largest force component of the force is oriented in a third spatial direction of the three spatial directions.

2. The tire test stand as claimed in claim 1, wherein at least one of the six linear drive elements of the hexapod assembly is configured as a hydraulic cylinder.

3. The tire test stand as claimed in claim 1, wherein at least one of the six linear drive elements of the hexapod assembly is configured as an electromechanical linear drive.

4. The tire test stand as claimed in claim 1, wherein the tire test stand further comprises a tire drive unit which, when the tire is rotatably attached to the tire holder, the tire drive unit can drive said tire in a tire revolving direction.

5. The tire test stand as claimed in claim 1, wherein the tire test stand further comprises a tire braking unit which, when the tire is rotatably attached to the tire holder, can brake said tire in a tire revolving direction.

6. The tire test stand as claimed in claim 1, wherein the tire test stand further comprises a belt drive unit which can drive the belt in a belt revolving direction, the belt drive unit is mounted on the frame.

7. The tire test stand as claimed in claim 6, wherein the belt drive unit is coupled to one deflection pulley of the deflection pulleys in order to drive the belt in the belt revolving direction via said deflection pulley.

8. The tire test stand as claimed in claim 1, further comprising:
a tire drive unit which, when the tire is rotatably attached to the tire holder, the tire drive unit can drive said tire in a tire revolving direction;
a tire braking unit which, when the tire is rotatably attached to the tire holder, can brake said tire in a tire revolving direction; and
a belt drive unit configured to drive the belt in a belt revolving direction.

9. The tire test stand as claimed in claim 8, wherein the belt drive unit is coupled to one of the deflection pulleys and arranged to drive the belt in the belt revolving direction via said deflection pulley.

\* \* \* \* \*